United States Patent [19]
Fujino

[11] Patent Number: 5,176,100
[45] Date of Patent: Jan. 5, 1993

[54] AQUARIUM WITH CLOSED WATER RECIRCULATORY SYSTEM FOR CULTURING FISH AND SHELLFISH

[75] Inventor: Kazuo Fujino, Tokyo, Japan
[73] Assignee: Okabe Co., Ltd., Tokyo, Japan
[21] Appl. No.: 733,474
[22] Filed: Jul. 22, 1991
[30] Foreign Application Priority Data
  Jul. 23, 1990 [JP] Japan ................. 2-193084
[51] Int. Cl.$^5$ ............................................. A01K 61/00
[52] U.S. Cl. ......................................................... 119/3
[58] Field of Search ................................. 119/2, 3, 4

[56] References Cited
U.S. PATENT DOCUMENTS

| | | | |
|---|---|---|---|
| 3,661,119 | 5/1972 | Sanders | 119/3 |
| 3,661,262 | 5/1972 | Sanders | 119/3 X |
| 4,043,299 | 8/1977 | Birkbeck et al. | 119/3 |
| 4,052,960 | 10/1977 | Birkbeck et al. | 119/3 |
| 4,137,868 | 2/1979 | Pryor | 119/3 X |

*Primary Examiner*—Gene Mancene
*Assistant Examiner*—Thomas Price
*Attorney, Agent, or Firm*—Pennie & Edmonds

[57] ABSTRACT

Toxic metabolic products (e.g., ammonia) in water can be decomposed effectively by a close contact of ammonia with oxygen on the large surface area of plastic substrates in the biofilter tank according to the aquarium of the invention. In the conventional method, toxic metabolic products such as ammonia have been oxidized by blowing air into the water or zeolite and activated carbons have been used to absorb unwanted products but which absorbents are required to be replaced or cleaned frequently to remove clogged materials. In contrast, the plastic substrates in the aquarium of the invention does not require such frequent replacement or cleaning. The rearing tank is connected with the biofilter tank and the algae culture tank via the sump, which functions as a buffer to prevent any adversary effect on the aquatic environmental factors in the reading tank. The sump contains a large volume of water, which also serves to minimize a sudden change in culture conditions. These designs of the aquarium of the invention will also serve to minimize losses of cultured aquatic life forms on such occasion.

10 Claims, 4 Drawing Sheets

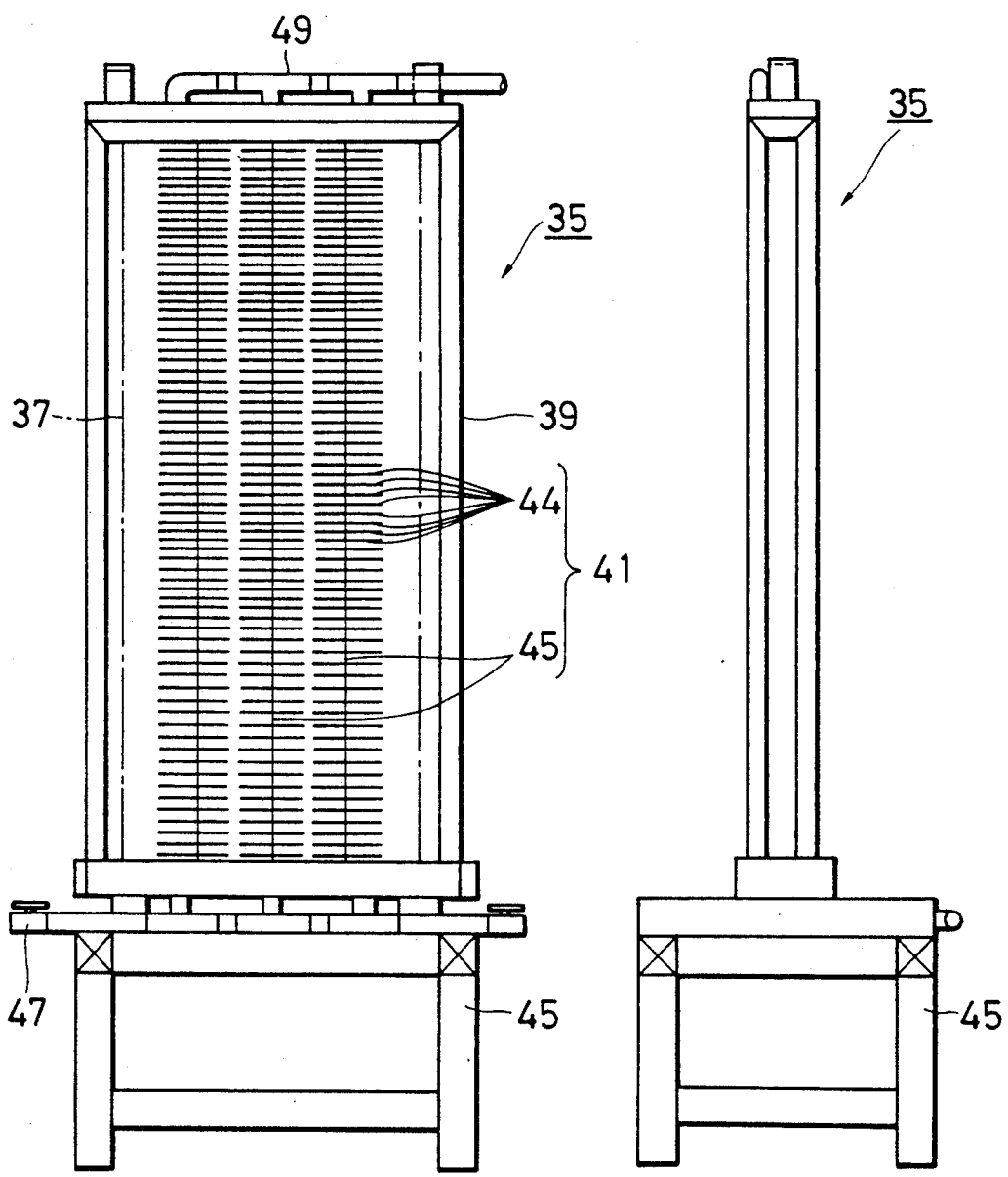

FIG.5
FIG.6
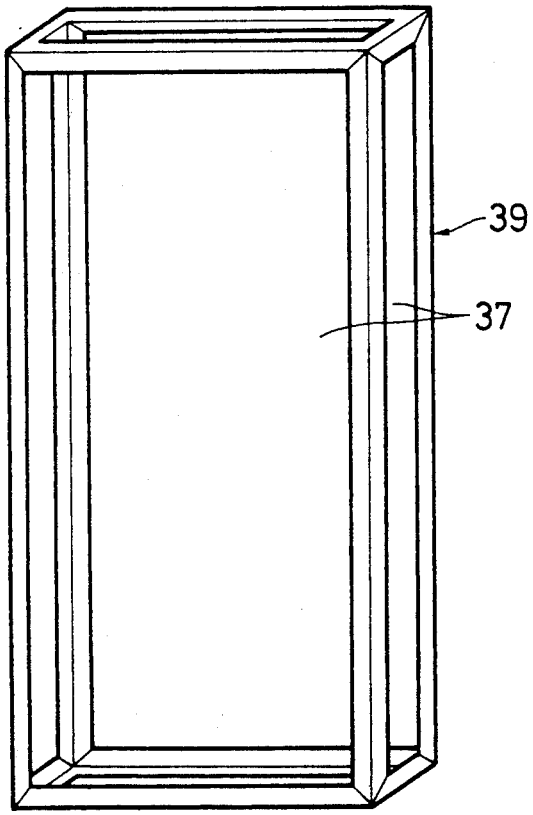
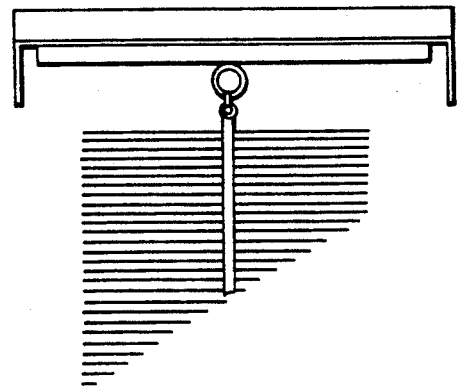

AQUARIUM WITH CLOSED WATER RECIRCULATORY SYSTEM FOR CULTURING FISH AND SHELLFISH

FIELD OF THE INVENTION

The present invention relates to an aquarium with a closed water recirculatory system for culturing aquatic life forms such as fish and shellfish in which water quality is maintained in a rearing tank by eliminating unwanted materials dissolved in water such as ammonia and nitrogen oxides while circulating the water throughout the system.

BACKGROUND OF THE INVENTION

A fish and shellfish culture technique with recirculatory system may be found in the literature such as "Method of purifying water in fish and shellfish culture facility and device thereof" in Japanese Patent Publication KOKOKU No. 49-37679, in which carbon dioxide, one of toxic metabolic products of fish and shellfish is removed from water in a culture facility and oxygen is supplied to the water in such the ways that carbon dioxide is removed by blowing air into the water; and ammonia or inorganic materials dissolved in the water are absorbed by zeolite or activated carbon, and that oxygen-rich air is blown into the water for supplying oxygen.

There have been various methods of purifying water in a fish and/or shellfish culture. The conventional oxidative disintegration method, for example, intended to disintegrate materials dissolved in water by blowing oxygen into water, is not an effective way to remove unwanted materials because of an insufficient contact of the unwanted materials with oxygen. The absorption method, intended to absorb away unwanted materials dissolved in water using zeolite or activated carbon, has another problem in relation to its extended period of operation, because the materials of zeolite or activated carbon are susceptible to clogging, unless they are frequently replaced with fresh materials or cleaned. To remove unwanted organic and/or inorganic materials dissolved in water, especially ammonia, is the most imperative problem for maintaining water quality suitable for an aquaculture of any given species of organism.

In the conventional aquarium with recirculatory system for fish and/or shellfish culture, a culturing tank is directly connected to a water purifying facility. When an accident happens during the operation of the system, water quality can be immediately deteriorated to cause an adverse effect on the cultivated organisms, resulting frequently in the death of a majority of the organisms.

One of the objectives of the present invention is to solve aforementioned problems and to provide an aquarium with a closed water recirculatory system in which unwanted materials dissolved in water, especially ammonia, are effectively removed away from the system during an extended period of its operation and an entire aquarium system (culture facility, ibid) is arranged in such a way that an operational accident of the system does not immediately affect on water quality in the rearing tank.

SUMMARY OF THE INVENTION

The present invention solves the aforementioned problems by providing an aquarium with a closed water recirculatory system for fish and/or shellfish culture.

The aquarium of the invention comprises a rearing tank for fish and/or shellfish, a sump where water is drained from the rearing tank and then recirculated to the rearing tank via a header tank, a biofilter tank where the water is drawn from the sump and ammonia dissolved in the water is oxidized and the resulting water is sent back to the sump, an algae culture tank where the water drawn from the sump and nitrogen oxides dissolved in the water is consumed by flora of algae and the resulting water is sent back to the sump.

The biofilter tank containing thousands of plastic substrates is equipped with a sprinkling means over the biofilter tank and an outlet of air-blower at the bottom of the tank. The algae culture tank contains another kind of substrate for the attachment of flora of the algae and is equipped with a set of illuminators for growing the algae.

In the aquarium of the invention, the circulatory routes I, II, and III are installed in such a way of multiple arrangements: the circulatory route I comprises the rearing tank for fish and/or shellfish, the sump where the water is drained from the rearing tank and recirculated to the rearing tank via the header tank; the circulatory route II comprises the biofilter tank where the water is drawn from the sump and ammonia dissolved in the water is oxidized and the resulting water is sent back to the sump; and the circulatory route III comprises the algae culture tank where the water is drawn from the sump and nitrogen oxides dissolved in the water is consumed by the alage and the resulting water is sent back to the sump.

The circulatory route I denotes the circulation through the rearing tank, the sump and the header tank. The circulating route II denotes the circulation through the sump and the biofilter tank where ammonia and the other materials dissolved in the water is oxidized. In the biofilter tank, ammonia dissolved in the water is oxidized by the contact with air along the surface of plastic substrates while the water trickles down from the top of the substrate layers through the bottom of the substrate layers in the tank. The contact of ammonia dissolved in water with air is futher enhanced by an air-blower. Oxidization of dissolved unwanted materials is performed in part by microorganisms naturally occurred along the surface of the substrates.

The water, which is treated in the biofilter tank and contains nitrogen oxides, is sent from the sump to the algae culture tank (via circulation route III) where nitrogen oxides are consumed by the algae and eventually removed from the system. A nitrogen oxide uptake by the algae functions by sun-shine during day-time as well as by an artificial illumination during night-time. The treated water of a reduced concentration of ammonia and nitrogen oxides is thus sent back to the rearing tank via the sump.

The three functional tanks, rearing tank, biofilter tank, and algae culture tank, join each other at the sump in a way of multiple arrangements. In case, when an accident happens in any one of the circulatory routes, but the other two routes keep function normally during the operation, the sump together with the three circulatory routes could provide a buffer function (corresponding to a condenser in an electric circuit) so that the resulting changes in environmental factors (e.g., water quality) in the culture tank can be minimized.

BRIEF DESCRIPTION OF THE DRAWING

FIG. 3 shows a front view of the algae culture tank.

FIG. 4 shows the side view of the algae culture tank.

FIG. 5 shows a perspective illustration of the frame of the algae culture tank.

FIG. 6 shows a partial vertical sectional view of FIG. 3.

Figure 1:
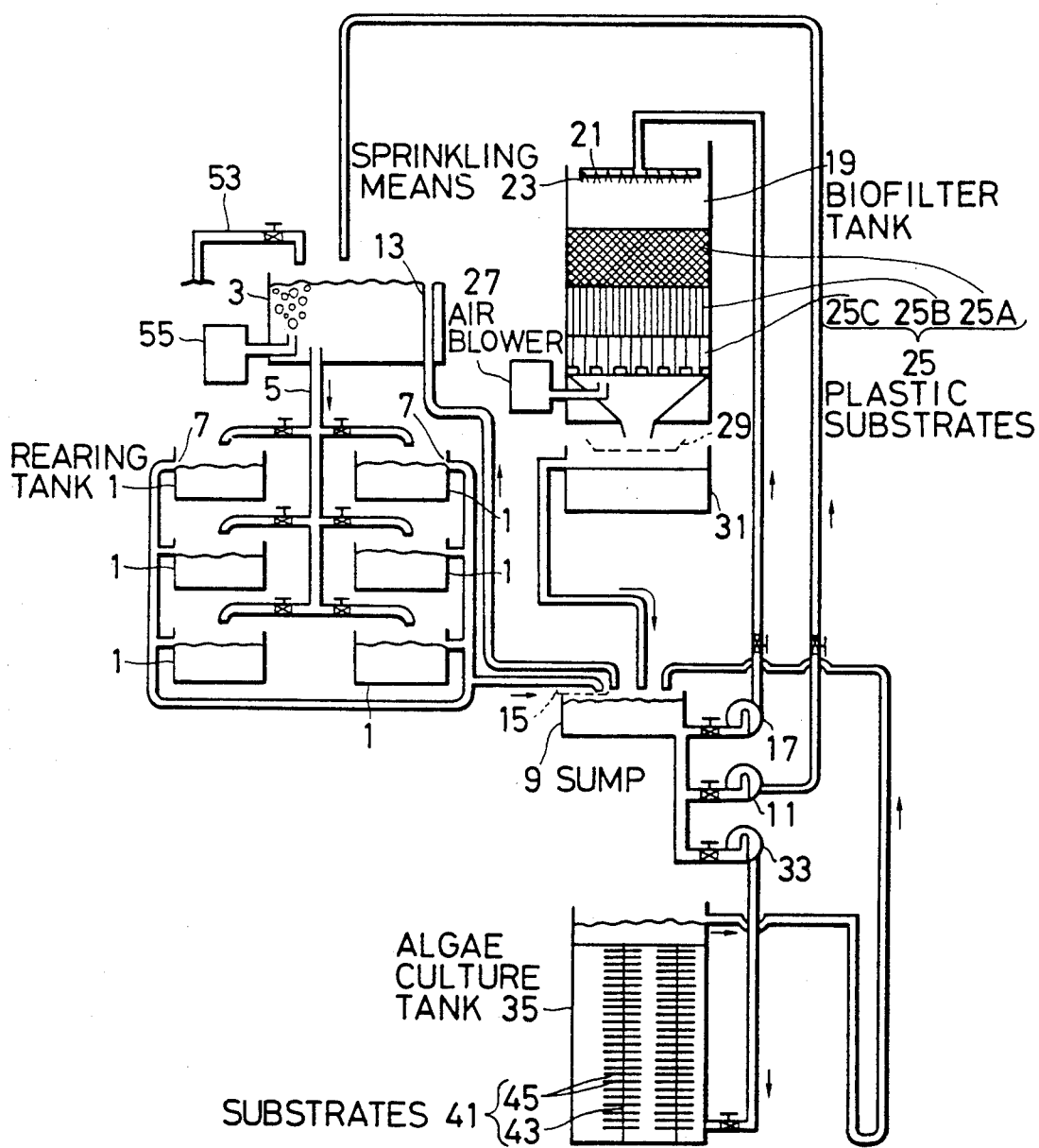
FIG. 1 shows a diagram illustrating the major arrangements of the three circulatory routes of water in the system.
Figure 2:
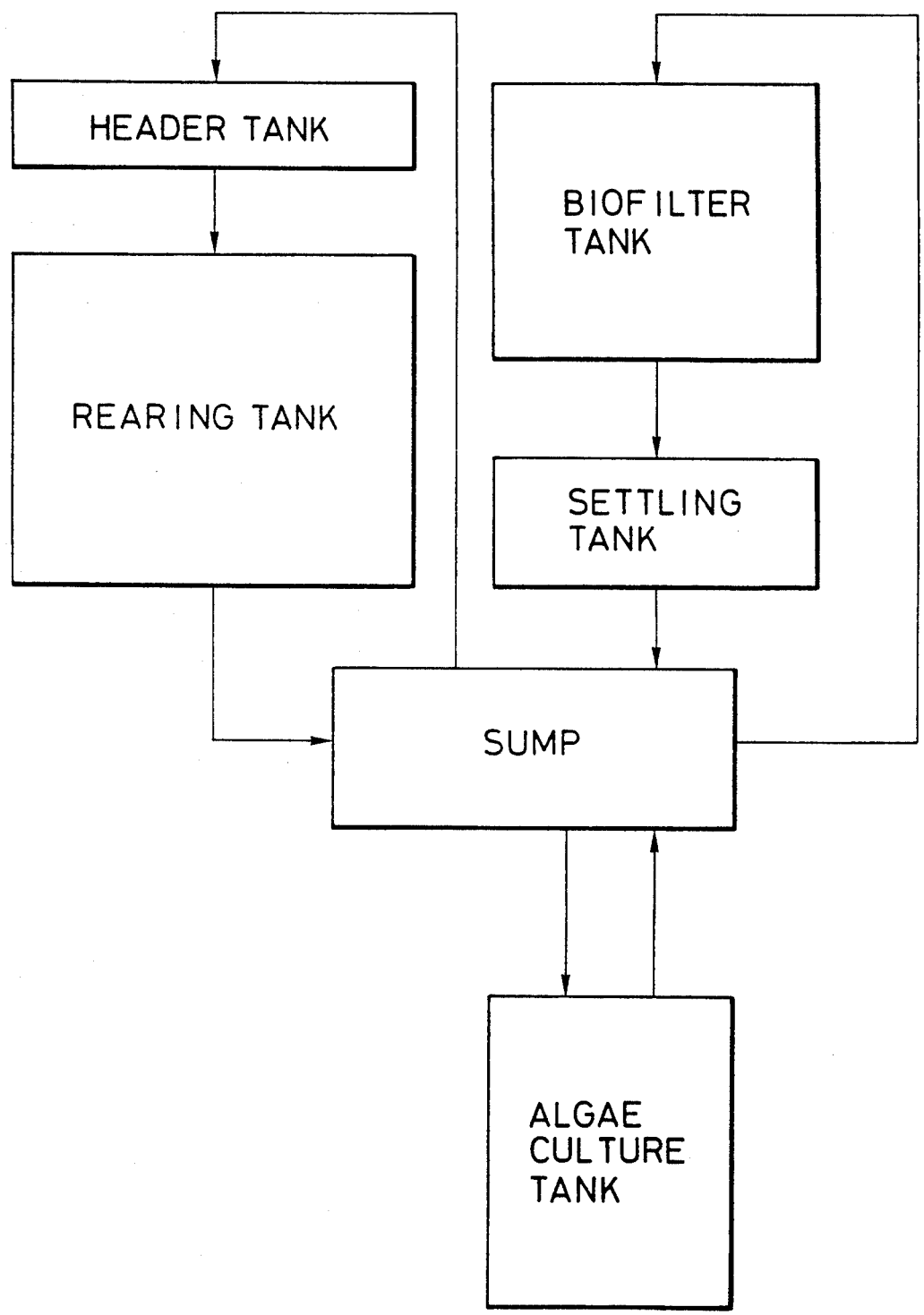
FIG. 2 shows a schematic diagram of water flow in the system.

1. Rearing tank, 3. Header tank, 9. Sump, 11, 17, 33. Pumps, 19. Biofilter tank, 31. Settling tank, 35. Algae culture tank

DETAILED DESCRIPTION OF THE INVENTION

The present invention will be further described by the following Example in conjunction with the Figures.

A fish and shellfish culture in the Example is intended to include whole aquatic life forms (e.g., aquatic organisms in fresh, brackish and sea water). The cultivation of fish and/or shellfish is carried out in a rearing tank 1. Water enters the rearing tank 1 from a header tank 3 placed at a given elevation from the rearing tank 1: the water flows at a constant flow rate by gravity from the header tank 3 into the rearing tank 1. Each of the six individual tanks of the rearing tank 1 receives in-coming water directly through multiple arrangements from the water supply pipe 5. The water flows toward a given direction (which is not shown in Figures) in each of the rearing tanks 1 to provide an environment suitable for the fish and shellfish culture. Each rearing tank 1 is connected to a drain pipe 7 through which the water containing undissolved wastes are automatically siphoned into the sump 9 situated in the center of the aquarium of the invention.

Circulatory Route 1 (Header tank 3-Rearing tank 1-Sump 9-Header tank 3)

The water in the sump 9 is drawin to the header tank 3 by a pump 11. The header tank 3 is designed to have two pipes for circulatory route I: The water impounded in the header tank 3 mainly flows to the rearing tank 1 via the water supply pipe 5 but the water above the level of the inlet of the overflow pipe 13 bypasses into the sump 9 directly through the overflow pipe 13. The design of the header tank 3 allows to maintain a constant water level in the header tank 3, which in turn helps maintain the constant flow rate of the water from the header tank 3 to the rearing tank 1.

Circulatory Route 2 (Sump 9-Biofiler tank 19-Settling tank 31-Sump 9)

The water drained from the rearing tank 1 flows into the sump 9 through a filter 15 which is made of glass wool and removes undissolved wastes. The water is then sent by a pump 17 from the sump 9 to a sprinkling means 21 over a biofilter tank 19. The sprinkling means 21 is a pipe with many small holes 23 through which the water is showered onto a plastic biofilter substrates 25 in the biofilter tank 19. The biofilter substrate 25 consists of three major layers; the top layer of small substrates 25A, the middle layer of medium size substrates 25B and a bottom layer of large substrates 25C. Any shape of the plastic substrate can be utilized as biofilter substrates (e.g., small basket shape, bead form, mesh type) and the biofilter tank 19 is filled with some tens of thousands of the substrates which provide several $m^2$ of a total surface area. Any material can be used as a biofilter, although polyethylene is used in the Example of the invention by the following reasons: Polyethylene can be any shapes and sizes. The polyethylene substrate can provide a large surface area that slows down the flow rate of water and can protect the biofilter tank from clogging.

The biofilter tank 19 is equipped with the outlet of an air-blower 27 at its bottom which blows air upward into the biofilter tank 19 to intensify exposure of downwardly trickling water against air along the surface of the plastic substrates. The filtrate is further filtered by a glass wool filter 29 to remove undissolved wastes and dripped into the settling tank 31. The supernatant in the settling tank 31 is returned to sump 9.

Circulatory Route 3 (Sump 9-Algae culture tank 35-Sump 9)

The water in the sump 9 is pumped into an algae culture tank 35 by a pump 33. The algae culture tank 35 (FIGS. 3-6) mounted on a support 45 is a framed tank comprises a frame 39 into which sheets of glass or transparent plastic 35 is inserted. The algae culture tank 35 is filled with water and the substrate 41 is suspended inside the tank for allowing growth of algae flora. The substrate 41 consists of a shaft 43 equipped with a brush-like arranged soft plastic bristles 45 (FIG. 6). The water enters through an inlet pipe 47 at the bottom of the tank into the algae culture tank 35 and is sent back to the sump 9 via an overflow pipe 49. A set of fluorescent light tubes installed outside the algae culture tank 35 is automatically switched on or off in accordance with the daily changes of intensity of sunlight in the evening or morning. The algae culture tank 35 receives light from the fluorescent tube at night and sunlight in the daytime. The algae brought in by cultured fish and/or shellfish is expected to grow on the surface of the substrate 41. Alternatively, a selected kind of algae is artificially placed on the substrate 41. An unicellular algae such as diatoms and a multicellular algae such as kelp may be used in the tank. A giant kelp found in Santa Barbara, Calif. grows more than ten inches per day and is suitable for a nitrogen uptake in the water in the tank.

The whole system of the invention including the three circulatory routes is preferably placed in an insulated structure to control temperature. The type of the insulator depends on climate of a place where the aquarium of the invention is installed. If the water is sea water, the salinity of the rearing tank is monitored and any evaporated water during operation should be refilled by the addition of fresh water to the header tank 3 via a water supply pipe 53 to maintain the salinity level. The header tank 3 is equipped with an air-blower 55 to supply oxygen gas into the water needed by the organisms reared.

The effects of the aquarium of the invention is described in detail as follows:

The header tank 3 supplies water to the rearing tank 1 in such a way that the water current is directed in a given direction in the rearing tank. The water drained from the rearing tank 1 containing undissolved and dissolved animal wastes is sent to the sump 9 and from there the water flows to the biofilter tank 19 by the pump 17. The sprinkling means 23 showers the water on the plastic substrates 25 in the biofilter tank 19 where the water trickling down through the substrates 25 is exposed to air blown from the blower 27 to oxidize ammonia dissolved in the water. Conventionally, oxidization of ammonia has been carried out under the surface of water, which results in insufficient oxidization of ammonia. In contrast, ammonia is sufficiently oxidized by the biofilter tank 19 of the invention due to the large surface area of the plastic substrates 25 that provide an effective contact of the water with air.

Soon after the aquarium of the invention starts to operate, microorganisms appear on the plastic substrates 25 in the biofilter tank 19. A population of the microorganisms increases gradually and a few weeks later, the increased population further facilitates oxidization of ammonia to convert to $NO_2$ and /or $NO_3$. The water filtered by the biofilter tank 19 goes to the filter 29 to remove undissolved wastes and drips into the settling tank 31. after precipitation, the supernatant is sent back to the sump 9. The water containing nitrogen oxides is drawn from the sump 9 to the algae culture tank 35 by the pump 33 where nitrogen oxides and carbon dioxide dissolved in the water are consumed by diatoms or giant kelps inhabited in the algae culture tank 35. Diatoms or giant kelps are further grown by absorbing animal wastes dissolved in the water, which in turn increases the ability of these algae to absorb more nitrogen oxides as well as carbon dioxide in the water. In addition, these algae consumes inorganic compounds dissolved in the water such as phosphates. The grown algae is removed from the tank from time to time when even necessary. After the algae treatment of the water, the resulting water of reduced concentration of nitrogen oxides is now suitable for culturing fish and shellfish and is sent back to the sump 9 and from there the water flows to the rearing tank 1 via the header tank 3.

Ammonia dissolved in the water is exposed to air in the biofilter tank 19 to be converted into less toxic nitrogen oxide. The resulting water, however, still contains nitrogen oxides and other toxic inorganic and organic materials so that the water is further purified in the algae culture tank 35 to remove these unwanted materials. Such a water purification system maintains water quality in the rearing tank 1 for an extended period of time.

The aquarium with a closed water recirculatory system of the invention can be used in various fields associated with aquatic life forms regardless of the size of aquarium if toxic metabolic products of aquatic animals such as ammonia are removed properly from the system by a purification process such as oxidation in the biofilter tank and absorption of nitrogen oxides in the algae culture tank and if a suitable environment in the culture tank is maintained.

First, the aqaurium with a closed water recirculatory system may be used for an aquaculture facility on the land to rear young fish and to grow youngsters to marketable sizes. If the aquarium of the invention is appropriately placed in an insulated structure to control temperature, the structure is constructed in any location regardless of climate. Similarly, any aquatic life form living in warm or cold water habitat can be cultured in the aquarium of the invention insulated by such a structure. In addition, while circulating the water, the animal wastes in the water is rapidly removed to give a suitable water quality for aquatic life forms so that the cultured fish and shellfish is efficiently raised in a relatively small facility. With the conventional aquarium, a large amount of water is pumped from the sea, river, or ground using electricity and the water containing the animal wastes have polluted the environments. The aquarium of the invention, however, recirculate water in the system, which not only save the cost of electricity but also keep the environments pollution-free. The aquarium of the invention may be utilized in the Seto island area where the environments have been polluted by the water drained from the conventional aquarium. Secondly, the aquarium can be used for developing and evaluating novel species and/or strains and for keeping brood stocks. The aquarium provides a stable conditions for aquatic life forms for an extended period of time and thus is utilized as a reliable facility to observe and evaluate newly bred aquatic animals. The aquarium is also easy to keep and manage established species. Thirdly, the aquarium of the invention can be used to keep aquatic life forms for public showplaces such as zoological gardens or animal parks. The water in the conventional aquarium in restaurants must be changed every few weeks regularly. In contrast, the aquarium of the present invention can maintain the water in suitable conditions for a long period of time and a frequent change of water is not required. The aquarium of the invention can be also used as zoological gardens for rearing the marine form of organisms in the inland areas.

What is claimed is:

1. An aquarium with a closed water recirculatory system comprising:
   a first circulation route including a rearing tank for fish and/or shellfish and a sump where water is drained from the rearing tank and recirculated to the rearing tank via a header tank;
   a second circulation route including a biofilter tank where water is drawn from the sump and ammonia dissolved in water is oxidized and resulting water is returned to the sump; and
   a third circulation route including an algae culture tank where water is drawn from the sump and nitrogen oxides dissolved in water is consumed by a flora or population of algae and resulting water is sent back to the sump.

2. The aquarium with a closed water recirculatory system of claim 1 wherein:
   the biofilter tank includes numerous plastic substrates, a sprinkling means over the tank that showers water onto the plastic substrates, and an airblower at the bottom of the tank that blows air upwardly into the tank; and
   the algae culture tank includes a substrate for the attachment of algae and a set of illuminators for the growing algae.

3. An aquarium with a closed water recirculatory system comprising three circulatory routes I, II, and III, said routes installed in multiple arrangements that can be operated simultaneously, wherein:
   said circulatory route I comprises a rearing tank for fish and/or shellfish and a sump where water is drained from the rearing tank and recirculated to the rearing tank via a header tank;
   said circulatory route II comprises a biofilter tank where water is drained from the sump and ammonia dissolved in water is oxidized and resulting water is sent back to the sump; and
   said circulatory route III comprises an algae culture tank where water is drawn from the sump and nitrogen oxides dissolved in water is consumed by algae and resulting water is sent back to the sump.

4. A closed water recirculatory system for an aquarium, comprising three parallel circulatory routes communicating through a common sump, wherein the first route includes a rearing tank, the second route includes a biofilter and the third route includes an algae culture tank.

5. The closed water recirculatory system of claim 4, wherein the algae culture tank includes a flora growth on substrates that consumes nitrogen oxides dissolved in the water received from the sump.

6. The closed water recirculatory system of claim 4, wherein the biofilter includes means for oxidizing ammonia dissolved in the water received from the sump.

7. The closed water recirculatory system of claim 4, wherein the first circulatory route further includes a header tank receiving water from the sump and delivering water to the rearing tank.

8. The closed water recirculatory system of claim 4, wherein the second circulatory route further includes a settling tank receiving water from the biofilter and delivering water to the common sump.

9. The closed water recirculatory system of claim 4, wherein the biofilter comprises a tank containing means for oxidizing and said means comprises:
   a plurality of plastic substrates;
   means for showering water onto the plastic substrates; and
   means for blowing air upwardly into the biofilter tank around the plastic substrates.

10. The closed water recirculatory system according to claim 4, wherein the first circulatory route further includes a filter disposed between the rearing tank and the sump for removing undissolved wastes from the water.

* * * * *